(12) United States Patent
Boyle et al.

(10) Patent No.: US 10,291,725 B2
(45) Date of Patent: May 14, 2019

(54) AUTOMATIC CAMERAMAN, AUTOMATIC RECORDING SYSTEM AND AUTOMATIC RECORDING NETWORK

(71) Applicant: H4 Engineering, Inc., San Antonio, TX (US)

(72) Inventors: Christopher T. Boyle, San Antonio, TX (US); Scott K. Taylor, San Antonio, TX (US); Alexander G. Sammons, San Antonio, TX (US)

(73) Assignee: H4 ENGINEERING, INC., San Antonio, TX (US)

( * ) Notice: Subject to any disclaimer, the term of this patent is extended or adjusted under 35 U.S.C. 154(b) by 156 days.

(21) Appl. No.: 14/648,574

(22) PCT Filed: Nov. 20, 2013

(86) PCT No.: PCT/US2013/070903
§ 371 (c)(1),
(2) Date: May 29, 2015

(87) PCT Pub. No.: WO2014/081767
PCT Pub. Date: May 30, 2014

(65) Prior Publication Data
US 2015/0312354 A1     Oct. 29, 2015

Related U.S. Application Data

(60) Provisional application No. 61/729,307, filed on Nov. 21, 2012.

(51) Int. Cl.
*G06F 15/16*     (2006.01)
*H04L 29/08*     (2006.01)
(Continued)

(52) U.S. Cl.
CPC .......... *H04L 67/16* (2013.01); *H04L 65/4069* (2013.01); *H04L 67/02* (2013.01); *H04L 67/10* (2013.01); *H04L 67/306* (2013.01); *H04N 21/21805* (2013.01); *H04N 21/231* (2013.01); *H04N 21/2387* (2013.01);
(Continued)

(58) Field of Classification Search
None
See application file for complete search history.

(56) References Cited

U.S. PATENT DOCUMENTS 5,572,317 A     11/1996  Parker et al.
7,453,488 B2    11/2008  Parker et al.
(Continued)

FOREIGN PATENT DOCUMENTS

WO     2001010128 A1     2/2001

*Primary Examiner* — Joshua Joo
(74) *Attorney, Agent, or Firm* — Volk & McElroy, LLP; Michael D. Volk, Jr.

(57) ABSTRACT

A network of systems to automatically record videos of one or multiple freely moving subjects using one or multiple cameras. The networked systems employ essential software for recording high quality videos. The network allows the development and use of additional software applications that modify and supplement the essential software. The network of systems further provides features for posting, playing, and streaming videos on a dedicated website, video hosting websites, and/or on social networking websites.

20 Claims, 4 Drawing Sheets

(51) Int. Cl.
*H04N 21/231* (2011.01)
*H04N 21/218* (2011.01)
*H04N 21/2387* (2011.01)
*H04N 21/2743* (2011.01)
*H04N 21/4788* (2011.01)
*H04L 29/06* (2006.01)

(52) U.S. Cl.
CPC ... *H04N 21/23109* (2013.01); *H04N 21/2743* (2013.01); *H04N 21/4788* (2013.01)

(56) References Cited

U.S. PATENT DOCUMENTS

| | | | |
|---|---|---|---|
| 8,429,730 B2 * | 4/2013 | Mardikar | H04L 9/3271 713/168 |
| D684,210 S | 6/2013 | Boyle et al. | |
| 8,576,281 B2 * | 11/2013 | Hammadou | G08B 13/19636 348/143 |
| D703,719 S | 4/2014 | Boyle et al. | |
| 8,704,904 B2 | 4/2014 | Boyle et al. | |
| D704,762 S | 5/2014 | Boyle et al. | |
| 8,749,634 B2 | 6/2014 | Taylor et al. | |
| D714,374 S | 9/2014 | Sammons et al. | |
| 8,836,508 B2 | 9/2014 | Taylor et al. | |
| D726,808 S | 4/2015 | Sammons et al. | |
| 9,007,476 B2 | 4/2015 | Glover | |
| 9,160,899 B1 | 10/2015 | Boyle et al. | |
| 9,253,376 B2 | 2/2016 | Boyle et al. | |
| D750,693 S | 3/2016 | Sammons et al. | |
| 9,294,669 B2 | 3/2016 | Glover | |
| 9,313,394 B2 | 4/2016 | Boyle et al. | |
| 9,456,174 B2 | 9/2016 | Boyle et al. | |
| 9,565,349 B2 | 2/2017 | Taylor et al. | |
| 9,578,365 B2 | 2/2017 | Boyle et al. | |
| 9,723,192 B1 | 8/2017 | Sammons et al. | |
| 9,730,330 B1 | 8/2017 | Boyle et al. | |
| 2001/0043785 A1 * | 11/2001 | Teshirogi | G11B 5/0086 386/264 |
| 2003/0187919 A1 * | 10/2003 | Nakamura | G06F 17/30828 709/203 |
| 2003/0234861 A1 * | 12/2003 | Sung | G08B 13/1963 348/143 |
| 2006/0050155 A1 * | 3/2006 | Ing | G06F 3/005 348/231.99 |
| 2008/0148330 A1 | 6/2008 | Liwerant et al. | |
| 2008/0178230 A1 | 7/2008 | Eyal et al. | |
| 2010/0214398 A1 | 8/2010 | Goulart et al. | |
| 2010/0269158 A1 * | 10/2010 | Ehler | G06F 17/30867 726/4 |
| 2011/0052155 A1 * | 3/2011 | Desmarais | H04N 5/76 386/290 |
| 2011/0181738 A1 * | 7/2011 | McAlpine | G01S 3/7864 348/207.11 |
| 2011/0304686 A1 * | 12/2011 | Qiu | H04N 7/15 348/14.08 |
| 2011/0311046 A1 * | 12/2011 | Oka | G06F 21/51 380/243 |
| 2012/0105572 A1 * | 5/2012 | Sammon | H04N 5/232 348/14.08 |
| 2012/0158935 A1 * | 6/2012 | Kishimoto | G06Q 50/01 709/223 |
| 2012/0169882 A1 | 7/2012 | Millar et al. | |
| 2012/0192225 A1 | 7/2012 | Harwell et al. | |
| 2012/0300080 A1 * | 11/2012 | Batson | H04N 21/23412 348/159 |
| 2012/0313557 A1 * | 12/2012 | Pettey | G08C 17/00 318/16 |
| 2013/0162852 A1 | 6/2013 | Boyle et al. | |
| 2013/0199251 A1 | 8/2013 | Taylor et al. | |
| 2013/0229528 A1 | 9/2013 | Taylor et al. | |
| 2013/0230293 A1 | 9/2013 | Boyle et al. | |
| 2013/0242105 A1 | 9/2013 | Boyle et al. | |
| 2014/0009632 A1 | 1/2014 | Glover | |
| 2014/0111653 A1 * | 4/2014 | Willemenot De Nanc | G01S 3/7864 348/169 |
| 2014/0204230 A1 | 7/2014 | Boyle et al. | |
| 2014/0267744 A1 | 9/2014 | Taylor et al. | |
| 2014/0375455 A1 | 12/2014 | Taylor et al. | |
| 2015/0143443 A1 | 5/2015 | Boyle et al. | |
| 2015/0195451 A1 | 7/2015 | Glover | |
| 2015/0208023 A1 | 7/2015 | Boyle et al. | |
| 2015/0241546 A1 | 8/2015 | Boyle et al. | |
| 2015/0249778 A1 | 9/2015 | Taylor et al. | |
| 2015/0312354 A1 | 10/2015 | Boyle et al. | |
| 2016/0133295 A1 | 5/2016 | Boyle et al. | |
| 2017/0134783 A1 | 5/2017 | Boyle et al. | |

* cited by examiner

AUTOMATIC CAMERAMAN, AUTOMATIC RECORDING SYSTEM AND AUTOMATIC RECORDING NETWORK

BACKGROUND

The present invention relates to photo or video recording of an activity, for example a sporting activity, using an Automatic Cameraman (referred to herein from time to time as "ACM"), and/or an Automatic Recording System (referred to herein from time to time as "ARS") and sharing the resulting recordings with friends and with the public using a network of Automatic Recording Systems. Also, the present invention relates to providing the manufacturer, users, and the marketplace with the ability to easily add additional functionality to an Automatic Cameraman and to increase the ease with which an Automatic Recording System interfaces with the Internet and modern content delivery devices such as smartphones, tablets, and televisions.

SUMMARY

In accordance with a preferred embodiment hereof, this invention provides a video recording network comprising a multiplicity of independently operated automatic recording systems connected to a host computer, wherein the automatic recording systems run firmware that is designed to produce high quality video recordings.

In accordance with another preferred embodiment hereof, this invention provides a method of video sharing, said method comprising the steps of creating independently operable automatic recording systems, wherein the recording systems are suitable to record high quality videos; providing the automatic recording systems with firmware suitable to record high quality videos; providing a video sharing network comprising a host computer and a web portal to which the automatic recording systems are connectable; registering the automatic recording systems as participants with the host computer; enabling uploading videos recorded by the automatic recording systems to the host computer; posting videos on the web portal; and streaming videos on the web portal.

In accordance with another preferred embodiment hereof, this invention provides a video sharing network comprising a host computer and a multiplicity of automatic recording systems, all of which are connected or are connectable through the Internet and wherein said automatic recording systems are built and run firmware designed to produce high quality video recordings.

This invention also provides each and every novel feature, element, combination, step, and/or method disclosed or suggested herein.

DETAILED DESCRIPTION OF THE PREFERRED EMBODIMENTS

Figure 1:
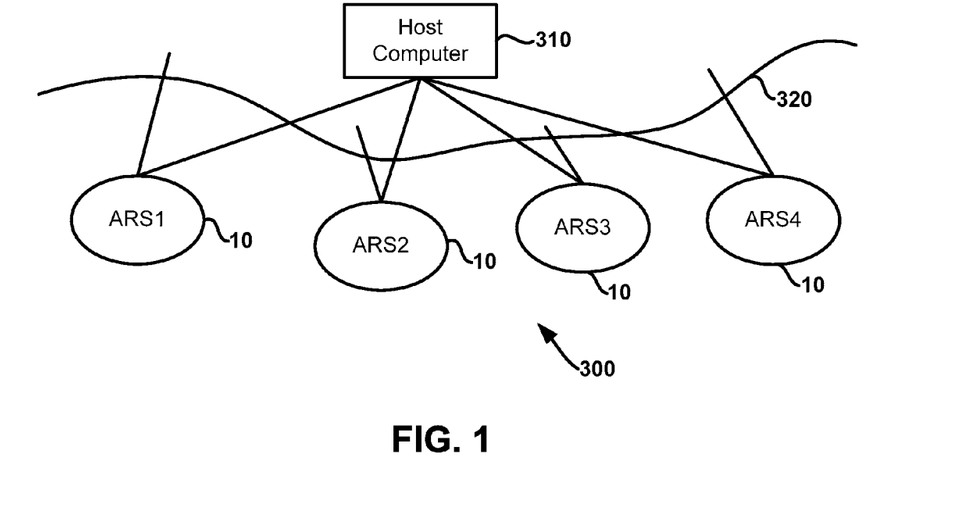
FIG. 1 shows a schematic diagram illustrating an overview of a Video Recording Network according to a preferred embodiment of the present invention.

FIG. 1 shows a schematic diagram illustrating an overview of a Video Recording Network according to a preferred embodiment of the present invention. Video Recording Network 300 preferably comprises host computer 310 having user accounts accessible through a network or the Internet. Video Recording Network 300 interacts and communicates with several of Automatic Recording System 10. FIG. 1 shows four Automatic Recording Systems (ARS1, ARS2, ARS3, and ARS4); however, any number of Automatic Recording Systems 10 may suffice. Each Automatic Recording System 10 is connected or connectable to host computer 310. The connection between ARS 10 and host computer 310 may be direct (such as by a wired connection) or indirect (such as through the Internet or the "cloud" via the ARS's built in cellular connection or through another device's Internet or cloud connection such as a cellphone or Wi-Fi hotspot). It should be noted that host computer 310 may comprise a single computer or a network of several computers that provide the features described herein.

Automatic Recording Systems 10 are typically connected or connectable to cloud 320 and generally to the Internet even if that is not their preferred method of connecting to host computer 310. It should be noted that the Automatic Recording Systems are operable without a connection to the Internet, cloud 320, or host computer 310. The ARSs are preferably connected periodically to download application software, upload recorded content, etc.

The Video Recording Network (also referred to herein as "VRN") enables users to automatically post content recorded with an ARS to a dedicated website and/or to a user's social media accounts (e.g., Facebook, YouTube, etc.). For those users who do not have social media accounts or those who do not want to store their social media login credentials on the Video Recording Network, the VRN will automatically post the video to an account associated with the owner of the VRN or a given user account so that all recorded content is searchable and discoverable by potential customers. The VRN may also give users the option to opt out of the automatic posting feature completely. The customers or users within the VRN operate Automatic Recording Systems. Each Automatic Recording Systems comprises one or more Automatic Cameramen (ACM). Each Automatic Cameraman comprises a camera attached to a pointing device, referred to as a positioner, that is controlled by a processor within a base station. Control of the pointing device is at least in part based on communication between the base station and a remote unit that is collocated with the subject of the recording. The automatic cameraman is, or can be, a standalone unit that can be operated with the help of firmware that drives the positioner such that the camera points substantially at the subject. When the Automatic Cameraman is further controlled by a User Control Unit, such as the system's remote unit or a mobile device, that runs additional software applications (referred to herein from time to time as "Apps") that may modify, override, complement, or otherwise influence the firmware operation, the resulting apparatus is referred to herein as an Automatic Recording System. An Automatic Recording System may control multiple Automatic Cameraman devices. Moreover, under Automatic Recording System control, a base station of an Automatic Cameraman may be paired with multiple remote units for multiple subjects, or multiple Automatic Cameraman devices may be paired to a single subject. Thus, the architecture of an Automatic Recording System as a system of Automatic Cameraman devices is modified; it may include recording units and remote units rather than Automatic Cameraman devices. A Recording Unit preferably comprises all components of an Automatic Cameraman but not a remote unit. The number of Recording Units and the number of remote units in an automatic recording system may differ. Recording, as used herein, may not necessarily refer to actual transduction of an image into a file but instead is the simple act of keeping a camera (that may or may not be actively filming, recording or broadcasting) substantially pointed towards a subject.

The VRN is designed to also receive all content from the participating Automatic Recording System, particularly the live feeds, and reorganizing or altering the received (uploaded) content that is otherwise viewable on social media and video content networks so as to create a new and improved user experience for consumption of all content and particularly live and high quality or interesting content by controlling the user interaction and consumption of that content and the advertising associated therewith.

In this description, the words recording, video recording, videotaping, filming and the like all refer to generating recorded images or recorded image series that can be played back and viewed, and that, for the viewer, appears either as a continuous motion picture, or as a series of photographs without regard to the actual recording device, its type of memory, recording medium, or means for recording.

The subject of the recording may be a person but it may also be an animal or an inanimate object.

The systems and methods disclosed herein comprise an apparatus and a method for an Automatic Recording System (ARS) where one or more non-essential software applications can run simultaneously with the essential software (i.e., firmware or operating system software). An Automatic Cameraman (ACM) is a generally portable device that can be set up at or in the proximity of an activity that a user wants to record; the device orients a camera towards a subject (target) such that the subject remains in the field of view of the camera during recording. The user and the subject may or may not be the same person. The Automatic Cameraman comprises a remote unit collocated with the subject or otherwise connected with the subject (e.g., the subject may wear or carry the remote unit, or the remote unit may be attached to a sporting equipment used by the subject), a positioner that orients the camera, and a processing unit (also referred to as a base station) that communicates with the remote unit, with the positioner, and, in some embodiments, with the camera. The Automatic Recording System comprises one or more Automatic Cameraman devices and a User Control Unit that runs additional software applications or apps. The implementation of an Automatic Recording System may be such that the User Control Unit is a stand-alone dedicated device, it may be a general use electronic device (e.g., a computer, a tablet, or a smartphone), or it may be integrated with one of the components of an automatic cameraman (e.g., with a base station or with a remote unit).

Firmware or operating system is defined as the computer code that is required to run additional software that, for example, keeps a camera oriented towards a subject. The system runs an operating system and pointing is accomplished by an App provided with the Automatic Cameraman and running on that operating system. Thus, only the most basic things like power management, image collection, and processing are at the level of code or firmware within the operating system. The automatic tracking and filming is accomplished by a Provided App for that system. In the context of this application, the automatic tracking feature of an Automatic Cameraman is considered "non-essential software" so that a person may get an Automatic Cameraman and use applications which provide functionality other than the automatic tracking feature. Non-essential software provides additional functionality or modifies the functionality of the operating system or firmware, or alters the intended use of the device (for example, in one embodiment, an application may convert an Automatic Cameraman into a time lapse photography device).

The Automatic Cameraman preferably includes firmware or an operating system and Provided Apps. A Software Developer Kit (SDK) is preferably made available that enables users to develop software applications (Apps) for the Automatic Cameraman hardware and operating system. These Apps may run on the device that runs the firmware for orienting the associated camera at a paired remote unit (i.e., at the subject), or they may run on top of, replace, or modify the firmware (which will be referred to herein as "Firmware Modifier Apps"). All other Apps are referred to herein simply as "Apps" (i.e., without an adjective other than a descriptive one which notes the functions of the App). The SDK is preferably made publicly available.

In one embodiment, the Automatic Cameraman runs an operating system that handles the most basic features of an Automatic Cameraman, such as power management, battery charging, driver control, and basic video signal processing. The operating system is capable of running additional Apps. One such App contains the tracking, motor, and camera control algorithms to command the positioner and camera to keep a remotely located subject in the camera's field of view with acceptable zoom and focus. In the case where the main purpose of the base station is that of controlling an automatic cameraman, this App is referred to as an "Essential App".

According to one preferred embodiment of the present invention, the base station runs the essential software or Essential App and another processing device that serves as a User Control Unit (e.g., a smartphone, a tablet, a computer, or a dedicated control device) runs its own App (or Apps) that communicates with and potentially modifies the workings of the base station and may also control camera functions and other hardware (e.g., light fixtures) directly. For example, the base station transmits recorded images or other content to the User Control Unit for additional automatic or user controlled processing, for broadcast, or for uploading to the Internet or to a network.

In another embodiment of the present invention, the user's smartphone or tablet acts as a Remote Unit as well as the User Control Unit ("UCU") whereby it uses its own location determination capabilities to coordinate with the base station such that the camera points at and continues to point at the User Control Unit and subject associated with it. In another embodiment, the User Control Unit is not collocated with the subject but is otherwise in communication with the Automatic Cameraman, thereby allowing anyone capable of controlling Apps on the user control unit to interact with the automatic cameraman. In another embodiment, the base station comprises a processing unit normally associated with a computer, a smartphone, or tablet or that may actually be integrated with a computer, a smartphone or a tablet, and may require an interface device for generating output signals to send control signals to the positioner, LEDs, the camera, etc. The input and output of commands and information to and from the user is accomplished using normally available computer I/O devices, such as using a touch screen.

As previously stated, most Apps are non-essential software that provide for tasks beyond orienting a camera at the subject or which alter the manner in which the camera orientation is controlled. In some situations, even the basic function of pointing a camera at a subject may be written as an App that runs on the essential operating software where such App may autoboot when the system is turned on. In either embodiment, tasks that may be accomplished or controlled using Apps may include, but are not limited to, the following examples: controlling or filtering different aspects of the pointing algorithms, such as pan or tilt; controlling (angular) velocity of camera motion; controlling camera functions like zoom, focus, camera mode (portrait/landscape), and flash; adjusting the movement of the camera to give a jittery hand held effect or to adjust focus such as to give an additional artistic effect, or to add additional preprogrammed or random movement before, during, or after a subject is tracked such as that which may be useful to filmmakers or videographers; overriding the firmware or fundamental tracking app such as, for example, causing the Automatic Cameraman to become or function as a time-lapse photo or video device where such App may allow users for example to program or otherwise control any or all of the degrees of freedom required for time lapse video or photos; replacing certain functionalities of the Essential App or taking control of certain aspects of the hardware via the operating system such as, for example, where the Essential App performs tracking calculations which controls the pointing direction of the camera, while a different App may provide alternative tracking calculations which may be optimized for the user's specific activity; providing additional functionality not provided by the firmware, the operating system or by the provided Apps, for example, an App that enables the Automatic Cameraman to stream the video to a server (host computer), which allows others to watch the video live, or an App may control a lighting device associated with an Automatic Cameraman, or simply starting or stopping video recording, or allowing a user to connect the automatic cameraman to various video sharing websites, social networks or a private or proprietary network; communicating with other electronic devices, such as, for example, communicating with applications running on a tablet which may also be connected with other Automatic Cameraman, base stations, and remote units whereby the user of the application can modify or otherwise choose the pairing between remote units and automatic cameras to watch various video feeds on demand or selecting which camera follows, films, and/or records which subject including choosing to have multiple cameras point at a single subject or setting "fields of tracking" whereby the cameras automatically jump to which ever subject comes into that cameras tracking field; communicating between the User Control Unit and Recording Units such that the user of the User Control Unit, like a user of a tablet computer, has an aerial view of locations of recording units and remote units and can see the status of which units are paired (which recording units are tracking which remote units); allowing the user to select one or more recording units or remote units from which to get a particular video feed using screen inputs (double tapping or swiping the icons of the selected units, for example) or to change which remote units are paired to which base station; the user control unit as a tablet may show small windows with live feed of the video streams; Apps may be used for professional television broadcasts, complicated movie shoots, military training and operations, broadcasting surfing or similar athletic competitions or field based sports where there are many athletes to cover at once; Apps running on other devices linked to an automatic recording system but not controlling it, like a smartphone, can receive information from the automatic recording system, such as a video feed, and provide an internet connection to the automatic recording system; an App may allow the user to edit video previously recorded; an App may modify recorded video files (for example, a recording process may be stopped and a new file started or a marker may be embedded to make it easier to locate a time point of interest for viewing and editing); an App may be used to post video files to an online network (for example, a command may cause an Automatic Recording System to save a video clip that was recorded starting at a particular time X (seconds before the time the command is given) or at time Y (seconds after the time the command is given) with a duration of T seconds, and it may also post the video clip online (X, Y. and T are time values, for example, X may be 60 seconds and T may be 25 seconds, or 80 seconds; in this example part of the video is recorded after the command is given); an App may let the user set or adjust the maximum allowable zoom level of the device, let the user override any aspect of the pointing vector (the vector pointing from the camera to the subject), or adjust the zoom/focus controls to let the user frame the subject accordingly; an App may give the user the ability to locate him or herself within a video feed displayed on a table computer touch screen and tap that area of the screen to cause the Automatic Cameraman to more accurately point at the remote unit ("snap to center" App); an App may give the ability to further manually zoom in on the remote unit and repeat the "snap to center" App task until the remote unit is appropriately centered (the zoom level or minimum zoom level can thus be altered to user preference, including zoom level above the maximum recommended given the limitations of the system; the setup of an automatic cameraman can thus be completed using the "snap to center" App either by the subject or by a separate user who is at the User Control Unit); an App may turn the Automatic Recording System into a broadcast device; Apps may be used after a video is recorded to cut the recording in order to retain only desired content, to overlay videos and music, to edit tempo (slow-motion, fast forward) and any other post production type task.

Apps may be downloaded and installed onto the User Control Unit, the base station, the remote unit, or all of them and turned on and off by the user of an Automatic Recording System. For example, a user may want the target's speed displayed on the recorded video, so the user downloads an App to the base station and or the User Control Unit which provides this functionality. The "snap to center" function may also be a built in feature of the essential App that controls the set up and operation of the automatic cameraman.

Figure 2:
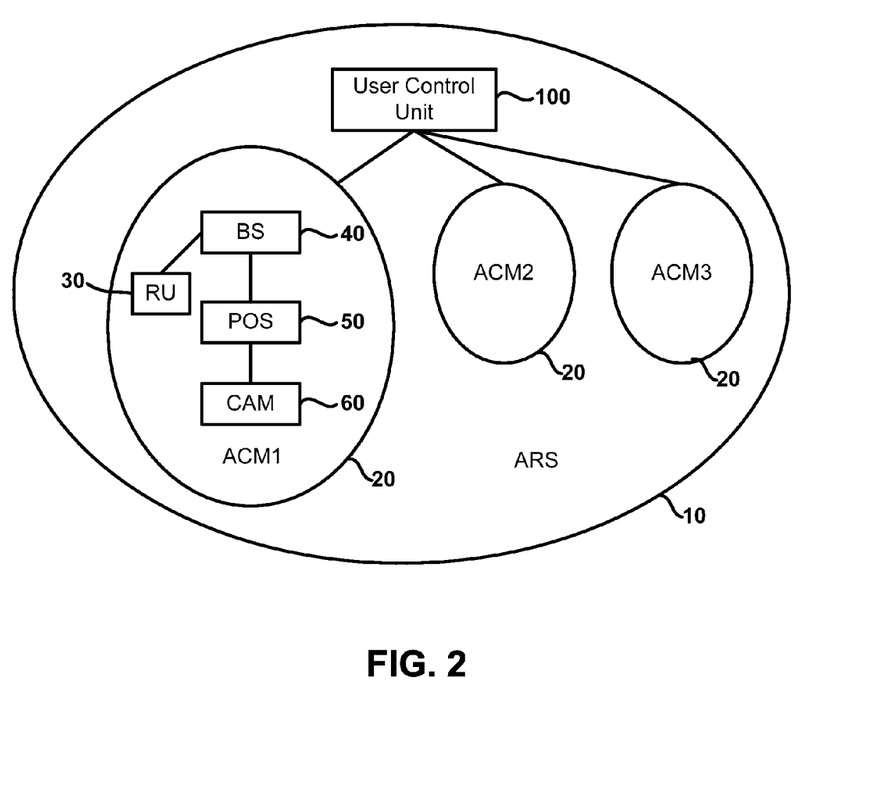
FIG. 2 shows a schematic diagram illustrating an overview of a first embodiment of an Automatic Recording System according to a preferred embodiment of the present invention.

FIG. 2 shows a schematic diagram illustrating an overview of a first embodiment of an Automatic Recording System according to a preferred embodiment of the present invention. More particularly, FIG. 2 shows Automatic Recording System 10 that preferably comprises one or more Automatic Cameraman 20 (ACM1, ACM2, and ACM3). Embodiments of the Automatic Cameraman are shown and described in the following commonly owned U.S. Patent Application which are hereby incorporated by reference herein in their entirety: U.S. patent application Ser. No. 13/726,222, filed Dec. 24, 2012, titled "System and Method for Initial Setup of an Automatic Recording System"; U.S. patent application Ser. No. 13/726,355, filed Dec. 24, 2012, titled "Automatic Orientation of a Pointing Device Using a Single Global Positioning Unit"; U.S. patent application Ser. No. 13/726,451, filed Dec. 24, 2012, titled "Feedback and Manual Remote Control System and Method for Automatic Video Recording"; U.S. patent application Ser. No. 13/726,380, filed Dec. 24, 2012, titled "Portable System for Automated Video Recording"; U.S. patent application Ser. No. 13/782,862, filed Mar. 1, 2013, titled "Apparatus and Method for Automatic Video Recording"; and U.S. patent application Ser. No. 13/784,536, filed Mar. 4, 2013, titled "Multifunction Automatic Video Recording Device".

With reference to the patent documents referred to in the previous paragraph, and with reference to FIG. 2, Automatic Cameraman 20 (see ACM1) preferably comprises base station (BS) 40 and remote unit (RU) 30 that communicate with each other in order to cause camera (CAM) 60 to keep remote unit 30 and a subject collocated with the remote unit, or at a known location relative to the remote unit, in its field of view. Keeping the subject in the field of view usually requires the system to continually update the pointing direction of camera 60 by adjusting the pan and tilt of the camera. This is accomplished by positioner 50 comprising at least one motor. In addition, the zoom and focus of camera 60 may also be adjusted as the subject moves.

In this specification, the meaning of High Quality Video Recording (HQVR) is based on the following discussion. In traditional camera recording, a second person is needed to control and position a camera for filming a subject. Because humans are imperfect, the quality of the recorded video may not be ideal. For example, the camera operator or cameraman may have an unsteady hand making the recorded video too shaky and unbearable to watch. Additionally, the cameraman may become tired and may not keep the participant in the view field of the camera. In this situation, the cameraman may fail to capture an exciting or interesting moment. In an automatic cameraman, commands to turn a camera for tracking a subject are based on a procedure that provides smooth and efficient positioning of the camera to generate high quality video. Additionally, focus and zoom commands are computed based on distance between the camera and remote device associated with the subject. The focus and zoom commands are also based on the size and velocity of movement of the subject being recorded. High Quality Video Recording is thus not dependent on pixel size, screen resolution, video compression technology, and the like.

Positioner 50 receives commands to turn from base station 40 which is the "brain" of ACM 20. Base station 40 may also control camera functions; including on/off, zoom, and focus. The camera control commands compute angles of direction between the pointing direction of camera 60 and remote unit 30, and provides features that are necessary to record videos smoothly and potentially artistically, resulting in high quality video recording (see patent documents referred to above for further reference).

In addition to Automatic Cameraman 20, Automatic Recording System 10 includes User Control Unit 100. User Control Unit 100 is preferably designed to modify the current automated camera control operation of base station 40 and is capable of running application software ("Apps") that can modify the preprogrammed operation of base station 40, thus adapting it to the preferences of the user. These "Apps" are made available for users of the system. User Control Unit 100 may communicate with an Automatic Cameraman 20 by a wired or wireless connection. User Control Unit 100 may share a location with or be substantially close to a base station 40 or to a remote unit 30 or it may be at another location. User Control Unit 100 and a Remote Unit 30 may be incorporated into a single device. User Control Unit 100 may be embodied as a generic commercial electronic device, such as a laptop or tablet computer, a smartphone, or the like. User Control Unit 100 may also be embodied as a dedicated device or by adding capability and/or functionality of remote unit 30.

Automatic translational camera movements may be integrated in the automatic cameraman as well. Realization of translational camera movements may require additional positioning hardware (e.g., motors, rails, cars, carts, etc.). Integration of automatic translation camera movements opens a whole new area of software application that may be developed to provide additional control or functionality to make use of this additional automatic cameraman hardware.

Remote unit 30, which may be the same as User Control Unit 100, may include a touch screen device capable of receiving input commands and displaying output information including live or recorded video feed from camera 60.

Figure 3:
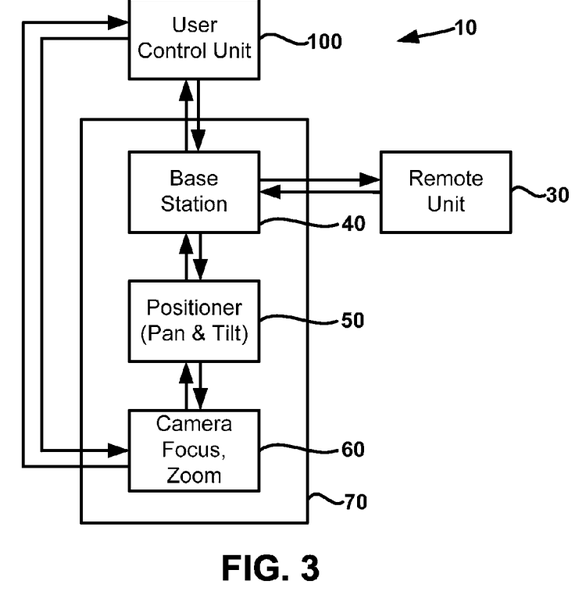
FIG. 3 shows a schematic diagram illustrating an overview of a second embodiment of an Automatic Recording System according to a preferred embodiment of the present invention.

FIG. 3 shows a schematic diagram illustrating an overview of a second embodiment of an Automatic Recording System according to a preferred embodiment of the present invention. According to the embodiment of FIG. 3, ARS 10 comprises a single recording unit 70 and a single remote unit 30. FIG. 3 also shows arrows illustrating two-way communication between the components of ARS 10. In this embodiment, User Control Unit 100 preferably communicates with base station 40 and camera 60. Base station 40 also communicates with remote unit 30 and with positioner 50, as shown.

Figure 4:
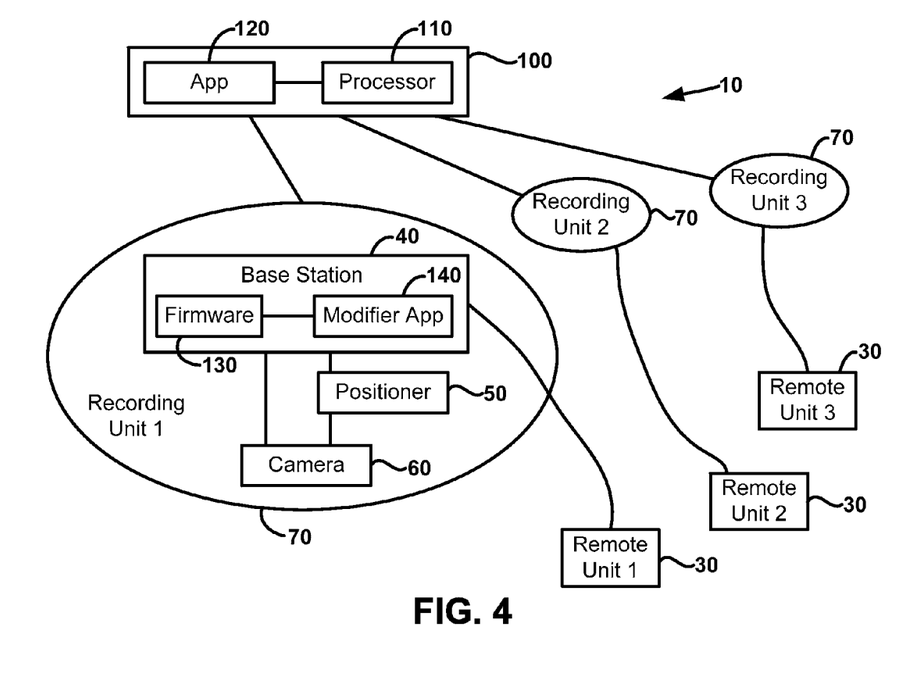
FIG. 4 shows a schematic diagram illustrating an overview of a third embodiment of the Automatic Recording System according to a preferred embodiment of the present invention.

FIG. 4 shows a schematic diagram illustrating an overview of a third embodiment of the Automatic Recording System according to a preferred embodiment of the present invention. In the preferred embodiment of Automatic Recording System 10 shown in FIG. 4, User Control Unit 100 and remote unit 30 communicate only with the "brain" (a microprocessor or microcontroller) in base station 40 to control pointing and camera actions (unlike in FIG. 3 where it is implied that camera 60 has its own microcontroller and user control unit 100 communicates directly with camera 60). However, the preferred mode is that User Control Unit 100 and remote unit 30 communicate with the operating system, firmware 130, or a modifier application 140 within base station 40 which then controls how the base station sends commands to the hardware (i.e., to positioner 50 and camera 60). Likewise, user control unit 100 and remote unit 30 may be in direct communication (not shown) allowing communication between the person using the user control unit to watch the recorded video feed and the person doing the activity.

In a preferred embodiment of the present invention, Automatic Recording System 10 is configured to record a multiplicity of subjects associated with a multiplicity of Remote Units 30 by a multiplicity of Recording Units 70 as shown in FIG. 4. For brevity, only one recording unit 70 in FIG. 4 is shown with its major elements (i.e., base station 40, positioner 50, and camera 60). Also, communication between components is illustrated using single connection lines. However, it should be understood that in most cases there is two-way communication between the components of Automatic Recording System 10, as shown in FIG. 3. FIG. 4 also shows the use of app 120. App 120 is a software application that enables processor 110 of User Control Unit 100 to control Recording Units 70. The firmware 130 and firmware modifier app 140 are software elements implemented in base station 40. Firmware 130 is responsible for the automatic orientation of camera 60 and, if available, for some adjustments of camera functions. Modifier app 140 implements various special functions, additional camera control, etc. Even though there is only one of each app type shown in FIG. 4, there may be more than one app running simultaneously, depending on user preference.

In the embodiment shown in FIG. 4, three recording units 70 and three remote units 30 are shown. It should be noted that the system illustrated in FIG. 4 does not require three of each of these units or even that the number of recording units must match the number of remote units. For example, one subject may be recorded by different cameras to show the subject from different vantage points. Also, a subject may not want to be filmed at all or for certain blocks of time. Furthermore, the communication connections illustrated in FIG. 4 are shown to be between Recording Unit 1 and Remote Unit 1, etc., however, preferably, a user who controls user control unit 100 may direct different cameras to point at different subjects (i.e., at different remote units 30) at different times. Moreover, an app may make the choice of pairing remote and recording units automatically based on a preprogrammed sequence such as the schedule of heats in a competition event or based on objective criteria, such as camera-to-remote unit distance or general location within practice field or race track. This preferred embodiment is designed for recording multiple subjects using multiple cameras 60 (e.g., automated recording of a surfing competition or of a soccer team's training session). The user or users in control of User Control Unit 100 may be at or near the venue of the activity or remotely located at great distance. There may be more than one user operating a User Control Unit and each may be granted a window of time for controlling ARS 10.

If a Recording Unit is mounted on a moving platform, like a car or a boat, the orientation of the camera is more difficult to control than if the camera is on a stationary platform. When a Recording Unit is positioned on a moving platform, pan and tilt adjustments combined are preferably sufficient to point camera 60 at remote unit 30 or keep camera 60 pointed at a target wearing or carrying remote unit 30 and freely moving around a relatively nearby environment. A roll function (turning around the axis of the camera lenses) may preferably be added for special effect, to switch between a landscape or portrait view, or when the location of a stationary base or the movements of a moving base require roll of the camera (e.g., to maintain a horizontal picture horizon).

In some preferred embodiments, base station 40 preferably communicates with camera 60. In some embodiments, Automatic Recording System 10 may comprise multiple Recording Units 70, each associated with a remote unit 30, as shown in FIG. 4. The embodiments of FIG. 3 and FIG. 4 comprise Recording Unit 70 which comprises Base Station 40, Positioner 50 and Camera 60. Recording Unit 70 may be fully or partially integrated (i.e., the base station, positioner, and camera may be in a single housing, forming a single device) or may simply be connected to each other. Recording unit 70 may comprise other parts then those listed, most notably, a tripod, for example.

Figure 5:
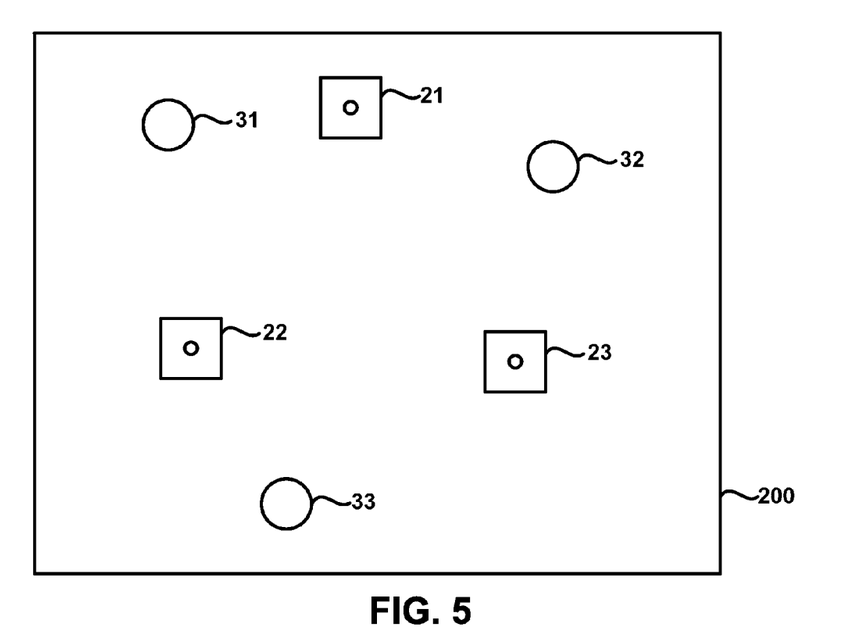
FIG. 5 shows a first schematic depiction of a screen of a computer used to control multiple recording units according to a preferred embodiment of the present invention.

FIG. 5 shows a first schematic depiction of a screen of a computer used to control multiple recording units according to a preferred embodiment of the present invention. More particularly, FIG. 5 is a schematic depiction of a two-dimensional aerial view of multiple subjects 31, 32, and 33, and multiple Recording Units 21, 22, and 23 on display 200 of, for example, a tablet computer serving as User Control Unit 100. The image illustrated in FIG. 5 may be obtained by superimposing a mapping app (e.g., Google Maps) with information generated with the aid of remote units 30 and may include information generated by Recording Units 21, 22, and 23. FIG. 5 shows three subjects (i.e., their remote units) and three recording units; a User Control Unit may control more or fewer of either. By tapping or other finger movement, the user of the control surface of display 200 may make or alter the connections between particular remote units and recording units such as to control which objects are being filmed by which cameras (in other words, the user may pair desired recording unit(s) with remote unit(s)). Likewise, various interactions with the control surface of display 200 can pull up a live video feed or other information associated with a particular subject or recording unit while highlighting (such as through color coding) which recording unit is tracking which subject. The system may display small windows of each video feed which may be enlarged through interactions with the touch screen. Such a system may be used by both amateurs and professionals, by individuals and/or teams, to film and/or broadcast all kinds of events in high quality in a cost-effective manner.

Figure 6:
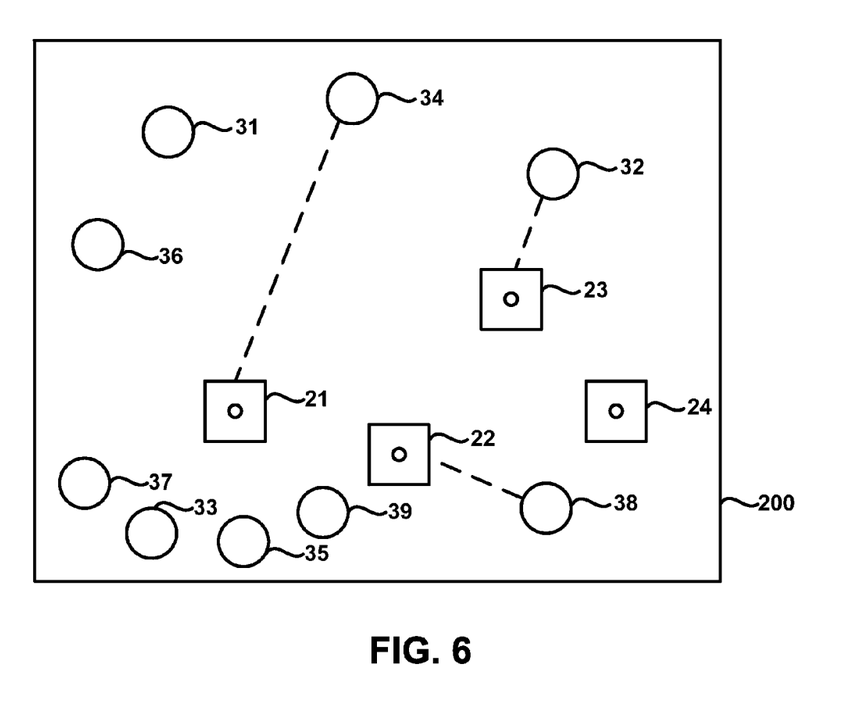
FIG. 6 shows a second schematic depiction of a screen of a computer used to control multiple recording units according to a preferred embodiment of the present invention.

FIG. 6 shows a second schematic depiction of a screen of a computer used to control multiple recording units according to a preferred embodiment of the present invention. FIG. 6 is a similar depiction of a computer display shown in FIG. 5 that displays participants in a competition. In this example there are only four recording units (21, 22, 23 and 24) but many more competitors (31-39). However, all competitors need not be filmed at the same time. The competitors take turns and the user may select the most appropriate cameras to record those competitors of interest. In another example, a schedule of heats may be known at the start of the day and the system may be programmed to follow the competitors in the heats accordingly. In yet another example, the participants are typically known to be located in certain areas during their heat and directly prior to their heat and the system may be programmed to film competitors within the competition area and switch to the new competitors entering the competition area either on command, through programming, or by detecting certain behaviors. The system also may include an override command.

To incorporate a wide variety of user generated applications, the firmware of the automatic cameraman allows users to write or download apps that provide additional functions like motion overlays, overrides, broadcast type controls, time lapse, etc.

As an additional feature, other computer controlled cameras may be used to record content for use with the Video Recording Network. Preferably, applications are developed for use with cameras in smartphones, tablet computers, or other computer controllable cameras so that they also record for use with the Video Recording Network.

The Automatic Recording Systems of the present invention are preferably connected to the cloud; the application preferably provides for streaming video uploads to a variety of hosts. An app is preferably provided for enabling developers to alter functionality or provide additional functionality and develop new software for the Automatic Recording System.

The Automatic Recording System may also include additional sensors, for example, in the remote unit or base station, or may interact with sensors included in the User Control Unit to provide additional information for use with essential software or application software (written for either the Automatic Recording System, the remote unit, the User Control Unit, or some or all of these) to provide additional data such as speed, g forces, height of jump, distance traveled, calories burned, heart rate, sounds, and others to be overlaid directly in videos or for use elsewhere such as in cloud hosting and data management sites or for storage and comparison to the results of others who have performed similar tasks or sports in similar areas. For example, a surfer may log their distance paddled, waves caught, max speed, wave size surfed, etc., and store this data in a cloud location for comparison with other surfers who have surfed in the same location or on the same day at another location while having video of those moments also stored for comparison and bragging rights.

The operation of automatic recording system comprises the following steps:
(a) initializing the system, including establishing connection with the Video Recording Network; (b) pairing recording unit(s) with remote unit(s); (c) getting raw data that serve as the basis of orienting camera(s) at subject(s) associated with a remote unit; (d) performing computations to determine turning angles for directing camera(s) to follow the subject (s); (e) directing positioner(s) to turn the camera(s) to the computed direction(s); and (f) allowing apps to modify the performance steps a-e and to control system components, such as cameras, and auxiliary devices, such as lights.

In a particular preferred embodiment of the present invention the method of the operation of the Video Recording Network preferably comprises the following major steps: (a) registering users of automatic recording system with the host computer; (b) establishing connection between user's User Control Unit and the host computer (server); (c) enabling user download of Apps; (d) enabling user development and upload of Apps; (e) enabling user upload of recorded and associated content to the host computer; (f) enabling auto-posting of recorded and associated content to video publishing websites, including specialized channels; (g) enabling autoposting of recorded and associated content on social media and social network sites; and (h) enabling user search, play, download of recorded and associated content by other users.

Associated content is defined as content that was added by the user to his or her recorded content (for example: music, data commentary, etc.).

Figure 7:
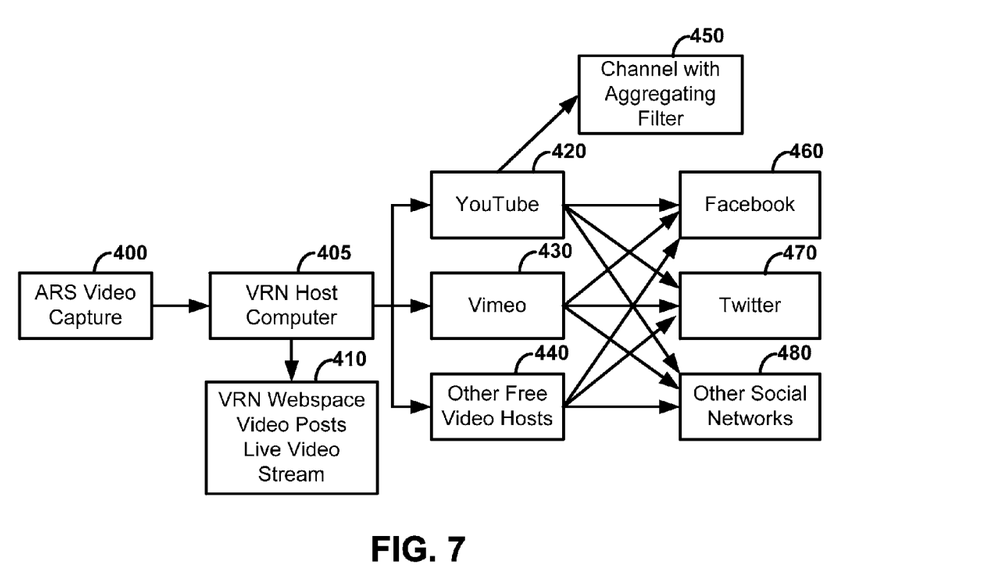
FIG. 7 shows a flow chart illustrating a method of video posting using a Video Recording Network according to a preferred embodiment of the present invention.

FIG. 7 shows a flow chart illustrating a method of video posting using a Video Recording Network according to a preferred embodiment of the present invention. The user captures video using an Automatic Recording System in step 400. The captured video is uploaded to the Video Recording host computer in step 405. This video may be a live feed or uploaded at a later time when an Internet connection is available or upon command of the user or another person. The uploaded video may be available as live stream through the VRN host and saved in host computer 310 (see FIG. 1) at the same time, step 410. The video may be streamed through the live feed capability of a free video hosting site such as YouTube in step 420, Vimeo in step 430, and/or other hosts in step 440. Alternatively, after saving the video on the VRN webspace in step 410, host computer 310 (see FIG. 1) is preferably configured to automatically post the video on sites where the user has accounts, e.g., YouTube, Vimeo, and/or other hosts, and directs them to also post links to user accounts on Facebook in step 460, Twitter in step 470, and/or other social networks in step 480. For some users, content may be posted to a VRN dedicated channel with aggregating filter in step 450. The VRN may choose to automatically post the video to its own YouTube and other accounts in order to ensure the video is available for public consumption even if the user has no accounts or has not entered their account information. The user may be given the option to opt out from or opt in to this auto-posting feature.

Figure 8:
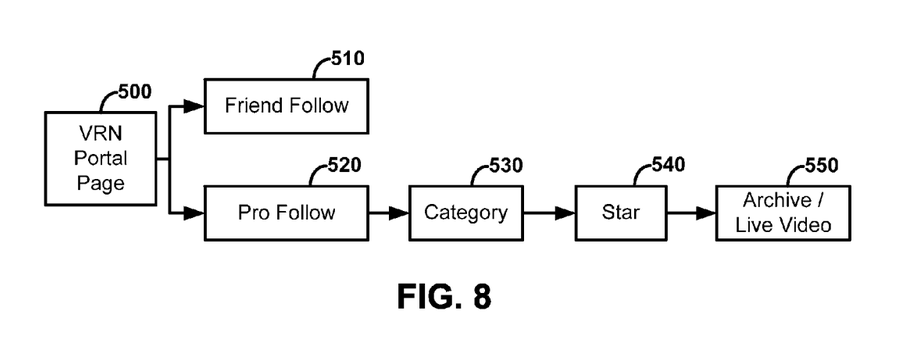
FIG. 8 shows a flow chart illustrating user navigation on the webspace of a Video Recording Network according to a preferred embodiment of the present invention.

FIG. 8 shows a flow chart illustrating user navigation on the webspace of a Video Recording Network according to a preferred embodiment of the present invention. More particularly, FIG. 8 illustrates the user experience of an embodiment of the Video Recording Network portal. The user visits the Video Recording Network portal page in step 500. The Video Networking Portal may also simply be a portal to stored and live content available through another hosting site such as YouTube. The web page comprises the ability to choose between options of watching and searching videos of friends (step 510) or professionals ("pros") (step 520). Other options, like following non-professional videos that have reached some level of popularity as determined by the number of views or some other process to screen for quality content may also be selected. Simultaneous following of several users may also be possible and may be accomplished, for example, by having a split screen that shows live feeds, if available, from friends and from professionals.

If a user opts to look at videos of friends in step 510, the user will be able to select a particular friend and view that friend's live action or recorded content. If the user elects to follow pros in step 520, he or she will be able to make a selection by category of activity (e.g. surfing, soccer, motocross, etc.) in step 530. This may be accomplished by clicking on descriptive pictogram icons. Next, the user can make a selection of a particular star in step 540 or simply browse videos or browse the names or icons of professionals with channels on the network. If a particular star is selected in step 540, the user may make a further selection between a live feed (if available) or saved recorded content in step 550.

The above description is aimed at pointing out some features of the Video Recording Network user experience while many other features that may or may not be standard for web portals are also available at the portal. The user may be able to quickly sort to see all live cams of friends and pros that they follow.

Different embodiments, features and methods of the present invention have been described with the aid of the figures. However, the particular described embodiments, features, and methods should not be construed as being the only ones that constitute practice of the invention. The described embodiments, features, and methods are in no way substitutes for the broadest interpretation of the invention as claimed.

What is claimed is:
1. A video recording network comprising:
a host computer;

a multiplicity of independently operated automatic recording systems comprising at least one positioner and at least one camera connected to said positioner and at least one remote unit collocated with a recording subject;

each of said automatic recording systems comprising a user control unit and one or more automatic cameraman units controlled by said user control unit;

said automatic recording systems are connectable to said host computer;

each automatic recording system of said automatic recording systems runs firmware that computes angles of direction between the camera and the remote unit and drives said positioner such that said camera points substantially at a respective subject to automatically record videos of freely moving subjects; and said host computer is configured to enable downloading applications to at least one of said user control unit configured to control a multiplicity of automatic cameraman units having different locations to orient cameras at any one of a multiplicity of remote units having different locations based in part on said different locations.

2. The video recording network of claim 1, wherein said automatic recording systems share videos recorded by said automatic recording systems via uploading to said host computer.

3. The video recording network of claim 1, wherein said host computer is configured to enable creation and sharing applications for the independently operated automatic recording systems, wherein the shared applications are configured for recording specific types of activity by providing access to a software development kit for developing and sharing software applications among said automatic recording systems.

4. The video recording network of claim 3, wherein said software development kit is downloadable to a computer connected to said host computer.

5. The video recording network of claim 1, wherein said host computer stores login information of registered users to video posting websites and to social networking websites and wherein said host computer is configured for posting videos on video posting websites and on social networking websites.

6. The video recording network of claim 5, wherein said host computer is configured for streaming videos on video posting websites and on social networking websites.

7. The video recording network of claim 1, further comprising a web portal and wherein said host computer is configured for streaming videos on said web portal.

8. The video recording network of claim 7, wherein said host computer is configured for posting videos on said web portal.

9. The video recording network of claim 1, wherein said host computer is configured to enable downloading applications to said user control unit configured to control a multiplicity of automatic recording systems to orient cameras at any one of a multiplicity of remote units based in part on a schedule of an event in which users colocated with the remote units are acting as participants in the event.

10. A method of video sharing, said method comprising the steps of:

creating a video sharing network comprising independently operable automatic recording systems configured to drive positioners such that cameras connected to said positioners point substantially at freely moving subjects colocated with remote units;

each of said automatic recording systems comprising a user control unit and one or more automatic cameraman units controlled by said user control unit;

providing firmware and applications for said independently operable automatic recording systems, said firmware and applications configured to make camera movements so the cameras keep pointing at the freely moving subjects;

providing a host computer and a web portal to which said automatic recording systems are connectable;

registering said automatic recording systems as participants with the host computer;

enabling uploading videos recorded by said automatic recording systems to the host computer;

posting videos on said web portal;

streaming videos on said web portal; and said host computer is configured to enable creation and sharing applications for the independently operated automatic recording systems, and the shared applications are configured to record specific types of activity by providing access to a software development kit for developing and sharing software applications among the automatic recording systems.

11. The method of video sharing of claim 10, further comprising the steps of:

registering operators of said automatic recording systems as users of the video sharing network;

storing credentials of the users of the video sharing network for login into video posting and social network websites;

automatically posting videos of the users on the video posting and social network websites; and automatically streaming videos of the users on the video posting and social network websites.

12. The method of video sharing of claim 11, further comprising the steps of:

keeping track of numbers of views of videos created by each user;

designating a class of users as professional;

designating a class of users as friends;

designating a class of popular users based on a number of views of their videos; and enabling users to follow video postings of users designated either as friends, professionals, or popular users.

13. A video sharing network comprising a host computer;

a multiplicity of automatic recording systems connectable to said host computer;

said automatic recording systems comprising one or more automatic cameraman units controlled by a user control unit;

said automatic cameraman units comprising a camera, a positioner that orients the camera, and at least one remote unit co-located with at least one freely moving subject of recording and a base station that communicates with said at least one remote unit;

firmware to operate said automatic recording systems and components of said automatic recording systems is downloadable from said host computer and videos recorded by said cameras of said automatic recording systems are uploaded to said host computer; and said host computer is configured to enable downloading applications to said user control unit configured to control a multiplicity of automatic cameraman units to orient cameras at any one of a multiplicity of remote units based in part on a schedule of an event in which users colocated with the remote units are acting as participants in the event.

14. The video sharing network of claim 13, wherein said host computer is configured to enable downloading camera orienting applications to said base stations that enable said automatic cameraman units to track said freely moving subjects.

15. The video sharing network of claim 14, wherein said host computer is configured to enable uploading and downloading applications to track freely moving subjects involved in different types of movements associated with different activities.

16. The video sharing network of claim 14, wherein said host computer is configured to enable downloading a snap to center application to said user control unit, wherein said snap to center application overrides the camera orienting application and causes a camera of a particular automatic cameraman unit to point at a manually selectable portion of a displayed image recorded by said particular automatic cameraman unit.

17. The video sharing network of claim 13, wherein said host computer is configured to enable downloading applications to said user control unit configured to control a multiplicity of automatic cameraman units having different locations to orient cameras at any one of a multiplicity of remote units having different locations based in part on said different locations.

18. The video sharing network of claim 17, wherein said host computer is configured to enable downloading applications to said user control unit configured to use said user control unit to manually choose automatic cameraman units based on locations of said automatic cameraman units displayed on a map to track any one of a multiplicity of remote units based on locations of said remote units displayed on said map.

19. The video sharing network of claim 13, wherein said host computer is configured to enable downloading an application to said user control unit, wherein said application converts an automatic cameraman unit into a time lapse photography device.

20. The video sharing network of claim 13, wherein said host computer is configured to enable downloading an application to said user control unit that provides for maintaining a horizontal picture horizon when an automatic cameraman unit is mounted on a mobile platform.

* * * * *